United States Patent Office 2,742,334
Patented Apr. 17, 1956

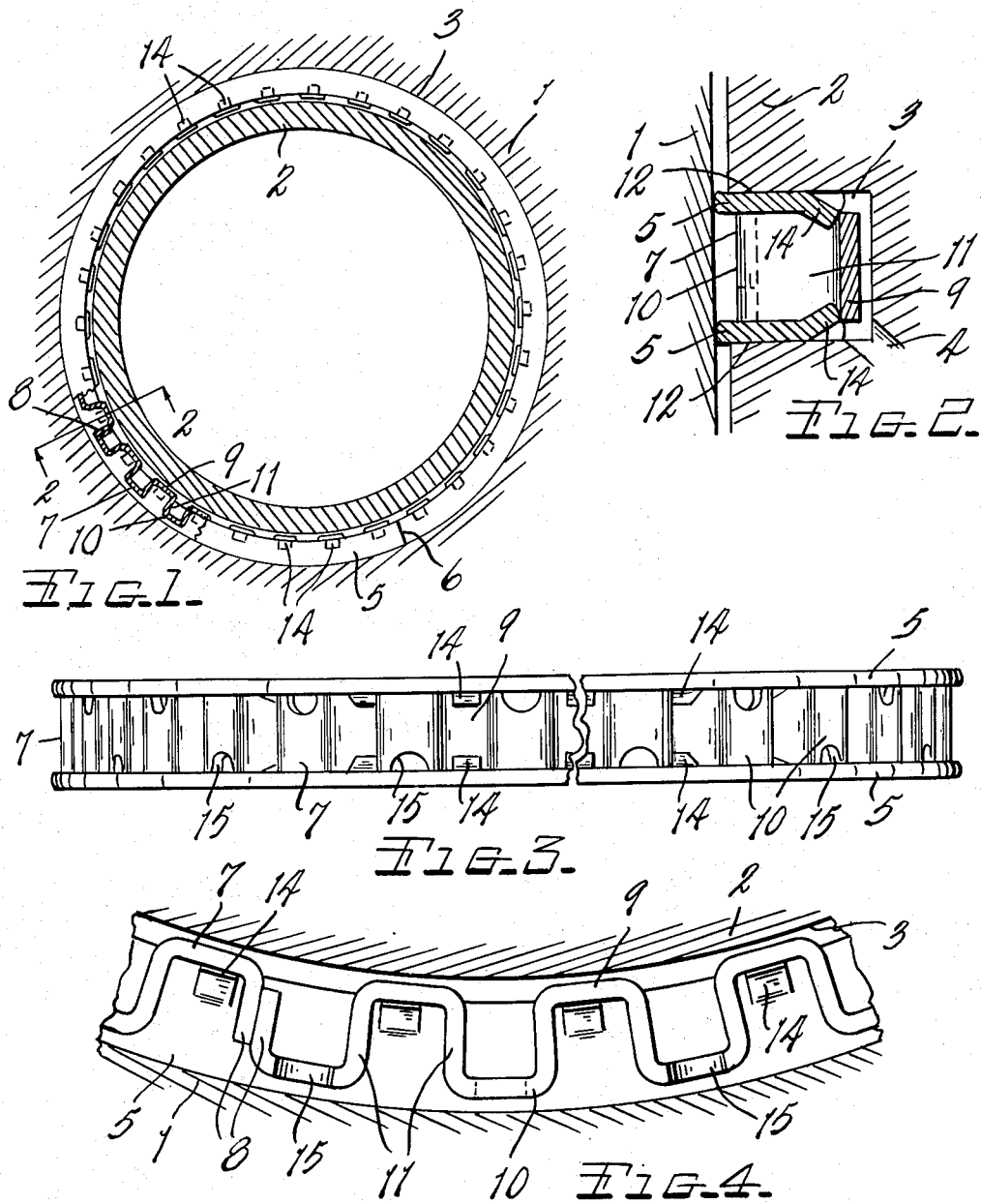

2,742,334
PISTON RING ASSEMBLY

Harold P. Phillips, Hastings, Mich., assignor to Hastings Manufacturing Company, Hastings, Mich., a corporation of Michigan Application June 22, 1953, Serial No. 363,131

4 Claims. (Cl. 309—29)

This invention relates to improvements in a piston ring assembly.

The main objects of this invention are:

First, to provide a piston ring assembly which is adapted for installation in piston ring grooves of varying depth.

Second, to provide a piston ring assembly comprising split expansible cylinder wall engaging elements adapted to be positioned in axially spaced relation at the sides of a piston ring groove, and a combined spacer and expander intermediate member which supports the cylinder wall engaging element in axially spaced relation and subjects them to substantially uniform springable radial thrust.

Third, to provide a piston ring assembly which may be very economically produced of ductile metal stock, is light in weight, and at the same time efficient and durable.

Objects relating to details and economies of the invention will appear from the description to follow. The invention is defined and pointed out in the claims.

A preferred embodiment of the invention is illustrated in the accompanying drawing, in which:

Fig. 1 is a fragmentary transverse section through a piston and cylinder with my ring assembly installed in a groove thereof, the assembly being shown in side elevation with a portion of one of the cylinder wall engaging elements partially broken away, and the combined expander and spacer shown in section.

Fig. 2 is an enlarged transverse section on a line corresponding to line 2—2 of Fig. 1.

Fig. 3 is an enlarged fragmentary edge view of the assembly.

Fig. 4 is an enlarged fragmentary view partially in section on a line corresponding to line 4—4 of Fig. 2, the combined spacer and expander member being shown in full lines.

It will be understood that in the accompanying drawing I have not attempted to illustrate the parts in their relative proportions or to indicate clearances and tolerances between the parts as the main purpose is to show the structure of the ring assembly in a ring groove of a piston and the relation of the parts thereof to the piston and cylinder.

In the accompanying drawing, 1 represents a cylinder, 2 a piston having a piston ring groove 3 therein, and 4 represents an oil drain, the ring assembly of my invention being particularly desirable for use as an oil ring. The ring assembly of my invention comprises the split annular cylinder wall engaging elements 5, 5 which are desirably formed of ribbon steel coiled edgewise. These elements are split at 6 and are radially expansible under the thrust of the combined spacer and expander element designated generally by the numeral 7. This member 7 is also split, terminating at its ends in radially disposed abutting portions 8.

The member 7 is formed of a strip of ribbon steel or ductile metal corrugated sidewise to provide inner and outer bights 9 and 10, respectively, of substantial length and connecting reaches 11 therefor disposed in a generally radial direction. The width of the strip corresponds to the spacing of the cylinder wall engaging members or rails 5 and is disposed axially edgewise between the rails or cylinder wall engaging elements 5 to support the same substantially throughout a major portion of the width thereof, in effect coacting with the walls 12 of the piston ring groove in providing grooves in which the ring elements 5 are arranged and supported for radial movement.

The ring elements have angularly spaced pairs of slits extending radially outward from the inner edges thereof, the portions between the slits being struck inwardly to provide inclined tongue-like abutments 14 which are supportingly engaged by the inner bights 9 of the combined spacer and expander intermediate member 7. The corrugations provide an annular series of circumferentially springable elements and when the ring assembly is installed, the ends 8 of the member 7 are in abutting relation so that the intermediate member is under springable compression and acts to support the cylinder wall engaging members or rails 5 in axially spaced relation and under radial spring thrust.

The corrugations of the intermediate member are of uniform size and shape so that the spring thrust is substantially uniform throughout the circumference of the intermediate member. Certain of the bights of the corrugations are provided with edge notches 15 providing drain openings.

The assembly is well adapted for installation in shallow grooves as illustrated and also in relatively deep grooves. The edge abutments 14 are spaced somewhat radially outward from the inner peripheries of the cylinder wall engaging elements (see Fig. 2) so that the radial width of the assembly only slightly exceeds the width of the cylinder wall engaging elements. The cylinder wall engaging elements may be desirably formed of stock of approximately .024 thickness.

The ring assembly of my invention may be very economically produced and is highly efficient and easily installed without liability of breakage or distortion.

I have illustrated and described my invention in a highly practical embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. A piston ring assembly comprising axially spaced annular split expansible cylinder wall engaging elements formed of ductile ribbon metal coiled edgewise and each having a plurality of angularly spaced abutment members offset inwardly from the inner edges thereof, said elements being otherwise radially flat, the elements being arranged in axially spaced relation with the abutment members projecting on their facing sides, and a split combined spacer and expander intermediate member formed of a strip of ductile metal corrugated sidewise and disposed axially edgewise between the cylinder wall engaging elements, inner bights of the corrugations being angularly spaced to correspond to spacing of and disposed under and in radial thrust supporting engagement with the abutment members of the cylinder wall engaging elements, the bights of a plurality of angularly spaced corrugations of said intermediate member having drain openings in an edge thereof, said intermediate member being under circumferential springable compression with its ends in abutting relation when the assembly is installed in a piston ring groove.

2. A piston ring assembly comprising axially spaced annular split expansible cylinder wall engaging elements formed of ductile ribbon metal coiled edgewise and each having a plurality of angularly spaced abutment members offset inwardly from the inner edges thereof, said elements being otherwise radially flat, the elements being arranged in axially spaced relation with the abutment members projecting on their facing sides, and a split combined spacer and expander intermediate member formed of a strip of ductile metal corrugated sidewise and disposed axially edgewise between the cylinder wall engaging elements, inner bights of the corrugations being angularly spaced to correspond to spacing of and disposed under and in radial thrust supporting engagement with the abutment members of the cylinder wall engaging elements, said intermediate member being under circumferential springable compression with its ends in abutting relation when the assembly is installed in a piston ring groove.

3. A piston ring assembly comprising axially spaced annular split expansible cylinder wall engaging elements formed of ductile ribbon metal coiled edgewise and each having a plurality of angularly spaced radially inclined tongue-like abutments offset inwardly from the inner edge thereof, said elements being otherwise radially flat from the outer to the inner edges thereof, the elements being disposed in axially spaced relation with their tongues projecting at their facing sides, the tongues being relatively short as compared to the radial width of the cylinder wall engaging elements, and a split combined spacer expander intermediate member formed of a strip of ductile metal corrugated sidewise and disposed axially edgewise between the cylinder wall engaging elements with its radially disposed reaches in supporting relation thereto while the outer sides of the cylinder wall engaging elements are in coacting relation to the adjacent side walls of the groove in which the assembly is installed, the said tongues being spaced to correspond to the spacing of the corrugations of said intermediate member their end edges being in radial thrust engagement with the inner bights thereof, the tongues being of less width than the bights, the corrugations of said intermediate member constituting an annular series of circumferentially springable elements, said intermediate member being under circumferential springable compression with its ends in abutting relation when the assembly is installed in a piston ring groove.

4. A piston ring assembly comprising axially spaced annular split expansible cylinder wall engaging elements formed of ductile ribbon metal coiled edgewise and each having a plurality of angularly spaced abutments offset inwardly from the inner edge thereof, said elements being otherwise radially flat from the outer to the inner edges thereof, the elements being disposed in axially spaced relation with their abutments projecting at their facing sides, and a split combined spacer and expander intermediate member formed of a strip of ductile metal corrugated sidewise and disposed axially edgewise between the cylinder wall engaging elements with its radially disposed reaches thereof in supporting relation thereto while the outer sides of the cylinder wall elements are in coacting relation to adjacent side walls of the groove in which the assembly is installed, the said abutments being spaced to correspond to the spacing of the corrugations of said intermediate member and being in radial thrust engagement with the inner bights thereof, and being of less width than the bights, the corrugations of said intermediate member constituting an annular series of circumferentially springable elements, said intermediate member being under circumferential springable compression with its ends in abutting relation when the assembly is installed in a piston ring groove.

References Cited in the file of this patent

UNITED STATES PATENTS

| Number | Name | Date |
|---|---|---|
| 2,229,578 | Malpas | Jan. 21, 1941 |
| 2,357,467 | Guelker | Sept. 5, 1944 |
| 2,369,263 | Teetor | Feb. 13, 1945 |
| 2,383,825 | Smith | Aug. 28, 1945 |
| 2,527,958 | Phillips | Oct. 31, 1950 |